(12) United States Patent
Kottapalli

(10) Patent No.: US 7,996,644 B2
(45) Date of Patent: Aug. 9, 2011

(54) FAIR SHARING OF A CACHE IN A MULTI-CORE/MULTI-THREADED PROCESSOR BY DYNAMICALLY PARTITIONING OF THE CACHE

(75) Inventor: Sailesh Kottapalli, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 100 days.

(21) Appl. No.: 11/026,316

(22) Filed: Dec. 29, 2004

(65) Prior Publication Data

US 2006/0143390 A1 Jun. 29, 2006

(51) Int. Cl.
*G06F 12/02* (2006.01)

(52) U.S. Cl. ........ 711/173; 711/128; 711/129; 711/130; 711/163; 711/E12.038

(58) Field of Classification Search .................. None
See application file for complete search history.

(56) References Cited

U.S. PATENT DOCUMENTS

| | | | | |
|---|---|---|---|---|
| 4,503,501 A | * | 3/1985 | Coulson et al. | 711/129 |
| 5,875,464 A | * | 2/1999 | Kirk | 711/129 |
| 5,996,055 A | * | 11/1999 | Woodman | 711/203 |
| 6,161,166 A | * | 12/2000 | Doing et al. | 711/125 |
| 6,591,347 B2 | * | 7/2003 | Tischler et al. | 711/134 |
| 6,604,174 B1 | * | 8/2003 | Dean et al. | 711/131 |
| 6,662,173 B1 | * | 12/2003 | Hammarlund et al. | 707/2 |
| 6,725,336 B2 | * | 4/2004 | Cherabuddi | 711/129 |
| 2002/0156979 A1 | * | 10/2002 | Rodriguez | 711/129 |
| 2003/0065886 A1 | * | 4/2003 | Olarig et al. | 711/129 |
| 2004/0143707 A1 | * | 7/2004 | Olarig et al. | 711/129 |

OTHER PUBLICATIONS

Office Action Received for Chinese Patent Application No. 200510121557.1 mailed on Sep. 28, 2007, 3 Pages of English Translation.
Office Action Received for Chinese Patent Application No. 200510121557.1 mailed on Feb. 27, 2009, 4 Pages of English Translation.

* cited by examiner

*Primary Examiner* — Shane M Thomas
*Assistant Examiner* — Ralph A Verderamo, III
(74) *Attorney, Agent, or Firm* — David P. McAbee

(57) ABSTRACT

An apparatus and method for fairly accessing a shared cache with multiple resources, such as multiple cores, multiple threads, or both are herein described. A resource within a microprocessor sharing access to a cache is assigned a static portion of the cache and a dynamic portion. The resource is blocked from victimizing static portions assigned to other resources, yet, allowed to victimize the static portion assigned to the resource and the dynamically shared portion. If the resource does not access the cache enough times over a period of time, the static portion assigned to the resource is reassigned to the dynamically shared portion.

39 Claims, 9 Drawing Sheets

FAIR SHARING OF A CACHE IN A MULTI-CORE/MULTI-THREADED PROCESSOR BY DYNAMICALLY PARTITIONING OF THE CACHE

FIELD

This invention relates to the field of cache memories and, in particular, to sharing a cache in a multi-resource environment.

BACKGROUND

Advances in semi-conductor processing and logic design have permitted an increase in the amount of logic that may be present on integrated circuit devices. As a result, computer system configurations have evolved from multiple integrated circuits in a system to the capability of storing multiple architecture states on a single integrated circuit, which allows for concurrent execution of multiple threads. Therefore, a single die may have multiple resources, such as multiple cores and/or multiple threads, to execute code in parallel.

A thread typically refers to the ability of an integrated circuit to store a separate architecture state/context for each thread, which may be associated with shared execution resources. Additionally, a thread may refer to an independent application, program, or software thread that is executed on a hardware thread or core. On the other hand, a core typically refers to an independent architecture state associated with dedicated execution resources, which may be physically contiguous and logically partitioned or physically separate. Yet, both a core and a thread may share some level of cache in a memory hierarchy, as well as other units, such as bus interface to communicate with external devices.

The use of one or more cache memory systems within a computer's memory hierarchy is a well-known technique to increase the performance of a computer. Traditionally, there have been three types of cache organizations that have been used: the fully associative, the k-way set associative; and the direct mapped cache organizations. In a fully associative cache organization, each item of information from a main system memory is able to be stored in any cache entry. In contrast, in a set associative cache, the cache is logically broken up into k banks of memory, i.e. k ways. A set associative cache "associates" the locations within a logically viewed page of memory to a corresponding cache line in each of the k ways based on an offset of the memory location within the page of memory. Therefore, every memory location corresponds to a "set" of cache lines within the k-ways. Similarly, a direct mapped cache is effectively a one way set associative cache associating memory locations to a cache line within the one way of the direct mapped cache.

During a memory transfer, a resource or processor generates a memory address, which references a location of an element. The term resource, referring to a core, execution core, hardware thread, software thread, or other threading technique. An element being an instruction or operand. A cache associated with the resource or processor is checked to determine if the element is present in cache or must be retrieved from system memory. Typical cache implementations using tag lookups, indexes, etc. are used to determine if the element is present in the cache. A cache hit refers to a determination that the element is present in cache. Alternatively, if the element requested is not present in cache, a cache miss results and the element is retrieved from a main system memory to replace the contents of a cache line within the cache. The process of replacement of an existing line to make space for a recent miss is also called as cache-line victimization.

Shared caches among multiple resources allow different independent program threads to share data and instructions without having duplicate misses to the cache. However, multiple resources sharing a cache may result in destructive interference if one resource victimizes much of the cache state belonging to another resource. An example of multiple resources sharing a single cache is illustrated in FIG. 1. Integrated circuit 140 comprises resource 145, resource 150, and Nth resource 155. Resources 145-155 share access to cache 160, which is organized as a four way set associative cache having ways 165-168. As can be seen, one of the resources 145-155, such as resource 150, may begin to monopolize cache 160 and victimize much of the cache state belonging to resource 145. Therefore, ensuring fairness across multiple resources becomes an important consideration.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific numbers of resources, specific sizes and organizations of caches, and placement of logic in order to provide a thorough understanding of the present invention. It will be apparent, however, to one skilled in the art that these specific details need not be employed to practice the present invention. In other instances, well known components or methods, such as specific implementation of threads/cores, as well as techniques of multi-threading have not been described in detail in order to avoid unnecessarily obscuring the present invention.

An apparatus and method for fairly accessing a shared cache with multiple resources, such as multiple cores, multiple threads, or both are herein described. The method and apparatus may be implemented in any level of a memory hierarchy structure. As an example, it may be implemented on a microprocessor, which has two multi-threaded cores, a first and second multi-threaded core. The use of the term multi-threaded core indicates that each core may execute a plurality of threads. Each multi-threaded core has a dedicated lower level cache. In this example, the apparatus and method described herein may be used to ensure fair sharing of the first core's dedicated cache between multiple threads executed on the first core. Additionally, the first and second core may share access to a higher level cache. Therefore, the method and apparatus described herein is used to ensure fair sharing of the higher level cache between the first and second core.

Figure 1:
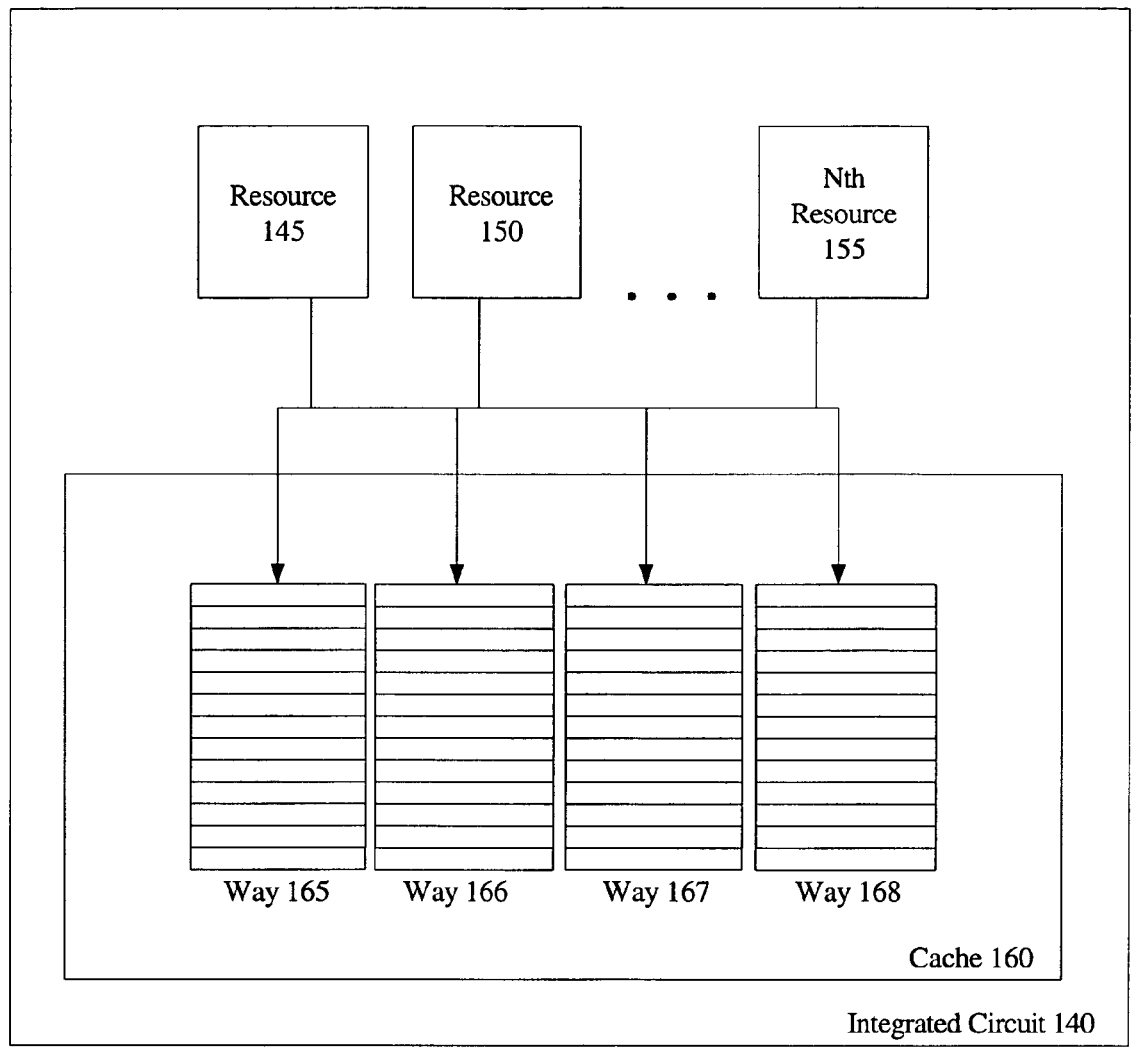
FIG. 1 illustrates a prior art embodiment of an integrated circuit having N resources sharing access to a cache.
Figure 2:
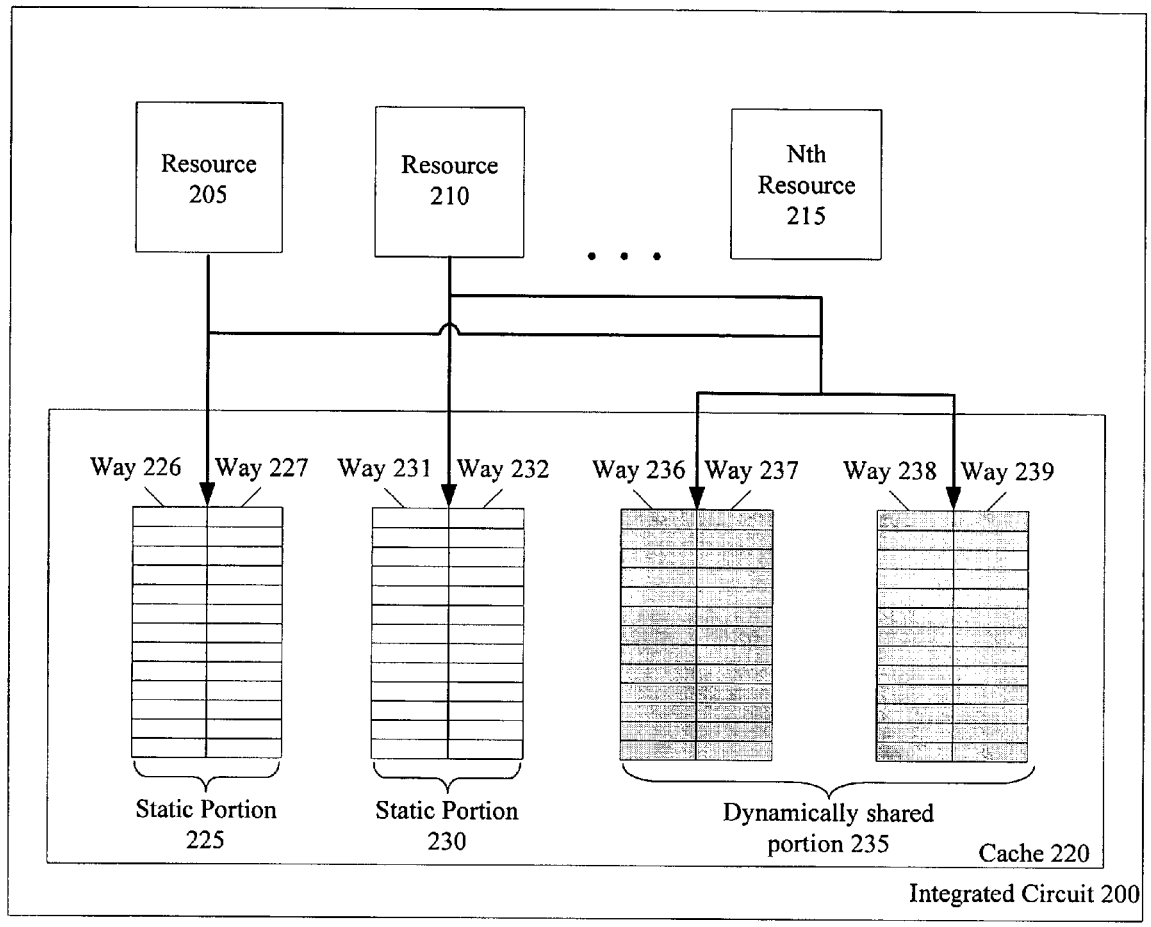
FIG. 2 illustrates an embodiment of an integrated circuit having N resources implementing fair sharing of a cache.

Turning to FIG. 2, an integrated circuit 200 comprising N resources, which share cache 220, is illustrated. Examples of integrated circuit 200 include a microprocessor, a co-processor, an embedded processor, or other processor that includes multiple computing resources and a cache. In one embodiment, integrated circuit 200 is a microprocessor capable of out-of-order speculative execution. The microprocessor being capable of executing independently from other microprocessors. However, the microprocessor may also be able to operate in conjunction or cooperation with other processors.

As shown in FIG. 2, integrated circuit 200 includes resource 205, resource 210, and Nth resource 215. Examples of the number of resources available in integrated circuit 200 include 2, 4, 6, 8, 12, etc. However, as it will become apparent though out the discussion, any number of resources may be present. The term resource, also referred to as computing resource, processing resource, and the like, generally refers to a core, execution core, hardware thread, software thread, implicit thread, explicit thread, or other threading technique. The term core usually includes the ability of logic in an integrated circuit to maintain an independent architecture state, also referred to as a context, where the independent architecture state is associated with dedicated execution resources. The execution resources do not have to be physically separated; in fact, the execution resources may be partitioned among the cores.

In contrast, a thread refers to the capability of a core or processor to pursue two or more "threads" of control. Therefore, each thread on an integrated circuit may store an architecture state/context that is associated with shared execution resources. Additionally, a thread may refer to an independent application, program, or software thread that is executed on a hardware thread or core. Therefore, it is apparent that integrated circuit 200 may be a multi-threaded processor, a multi-core processor, or a multi-threaded-multi-core processor, all capable of executing multiple software threads.

As depicted, at least resources 205 and 210 share access to cache 220. Cache 220 may be any level cache in integrated circuit 220's memory hierarchy structure, as noted above. Cache 220 has a plurality of static portions, including static portion 225 and static portion 230, as well as dynamically shared portion 235. The term static portion referring to dedication of a portion of cache, such as at least one way within cache, to one or more resources, such as a core or thread. Cache 220, as illustrated, is organized as a set associative cache having eight ways including: way 226, 227, 231, 232, and 236-239. However, cache 220 is not so limited. Often cache 220 is a static random access memory (SRAM) or other memory that has faster access times than a main system memory. Therefore, cache 220 may be physically organized in any manner, as well as logically organized as a set associative cache or other organizational structure.

Here, static portion 225 is assigned to resource 205 and static portion 230 is assigned to resource 210. Furthermore, dynamically shared portion 235 is assigned to both resource 205 and resource 210. Dynamically shared portion 235 will be discussed in more detail below. Static portion 225 includes ways 226 and way 227, while static portion 230 has ways 231 and 232; however, any number of ways may be present in a static portion. As shown from the lines designating the assignment of static portion 225 and static portion 230 in FIG. 2, static portion 225 is not assigned to resource 210 and static portion 230 is not assigned to resource 205.

In one embodiment, resource 205 can access static portion 230, assigned to resource 210, to request an element and receive that element from static portion 230; yet, resource 205 is not operable to victimize static portion 230.

As an example, resource 205 generates a linear address that references a location of the element in a main system memory. A portion of the linear address is used to compare against tag values in potentially all of the ways of cache 220, including ways 231 and 232, to see if the element is present in cache 220, i.e. if there is a cache "hit." If there is a cache hit within any of the ways, including ways 231 and 232, the element is returned to resource 205 or a path associated with resource 205 for execution. However, if the element is not present in cache 220, i.e. a cache "miss," then the element is retrieved from the main memory. Since static portion 230 is assigned to resource 210, resource 205, in this example, is not allowed to victimize static portion 230. Consequently, when choosing a way to replace a line of cache with the element fetched from the system memory, static portion 230 is blocked from being allocated the miss, i.e. victimized, by resource 205. More specifically, when choosing a way to be victimized, a line within way 231 and way 232 may not be chosen for replacement by the element fetched from the system memory, when the cache lookup is initiated by resource 205.

The blocking of resource 205 from victimizing ways 231 and 232 may be implemented on top of many well-known cache replacement algorithms. For example, when a cache miss occurs, a cache replacement algorithm, such as a time based algorithm, is used to choose a way within cache 220 to replace a cache line or choose a way to allocate the cache miss to. Another way of stating it is the replacement algorithm is used to choose a way within cache 220 to victimize. Therefore, if static portion 230 is blocked from being victimized by resource 205, when choosing a way within cache 220 to victimize upon a miss from resource 205, a well-known replacement algorithm is used to choose between the ways in static portion 225 and dynamically shared portion 235, excluding static portion 230's ways from the selection.

The previous embodiment was described utilizing only two resources; yet, integrated circuit 200 may have any number of resources. Additionally, it is possible to allow a resource to access or victimize a static portion assigned to another resource. As an illustration, if Nth resource 215 was assigned to way 236 and way 237, leaving only way 238 and way 239 as dynamic portion 235, then static portions 225 and static portion 230 may be assigned to both resource 205 and resource 210.

Therefore, if Nth resource 215 were to initiate a cache lookup resulting in a cache miss, only ways 236-237, the static portion assigned to Nth resource 215, and ways 238-239, the dynamic portion, are potentially victimized. However, if resource 205 or resource 210 initiates a cache lookup that resulted in a cache miss, then way 226, 227, 231, and 232, the static portions assigned to both resource 205 and 210, as well as way 238-239, the dynamic portion, are victimizeable. In addition, static portions may overlap. For example, static portion 225, assigned to resource 205, includes way 226, 227, and way 231, while static portion 230, assigned to resource 210, includes way 227, way, 231, and way 232. As a result, ways 227 and 231 overlap between static portions, allowing both resource 205 and resource 210 to victimize ways 227 and 231, but not allowing nth resource 215 to victimize them.

As the above examples illustrate, dynamically shared portion 235 is accessible by all of the resources. However, it is not required that dynamically shared portion 235 be accessible by all the resources. For instance, dynamically shared portion 235 is made available to all the resources except for resource 210 to be victimized. In one embodiment, the number of ways in dynamically shared portion 235 is equal to the number of resources present in integrated circuit 200. As an illustration, integrated circuit 200 has 8 resources, which are any combination of cores and/or threads. Cache 220 has a size in ways of 16 ways. Each of the 8 resources are assigned 1 way as a static portion, totaling 8 static portions and a dynamic portion having a size of 8 ways. Therefore, when a cache lookup is initiated by any one of the 8 resources that results in a cache miss, 9 ways of cache (the 1 assigned way and the 8 dynamically shared ways) are available to be victimized.

Figure 3A:
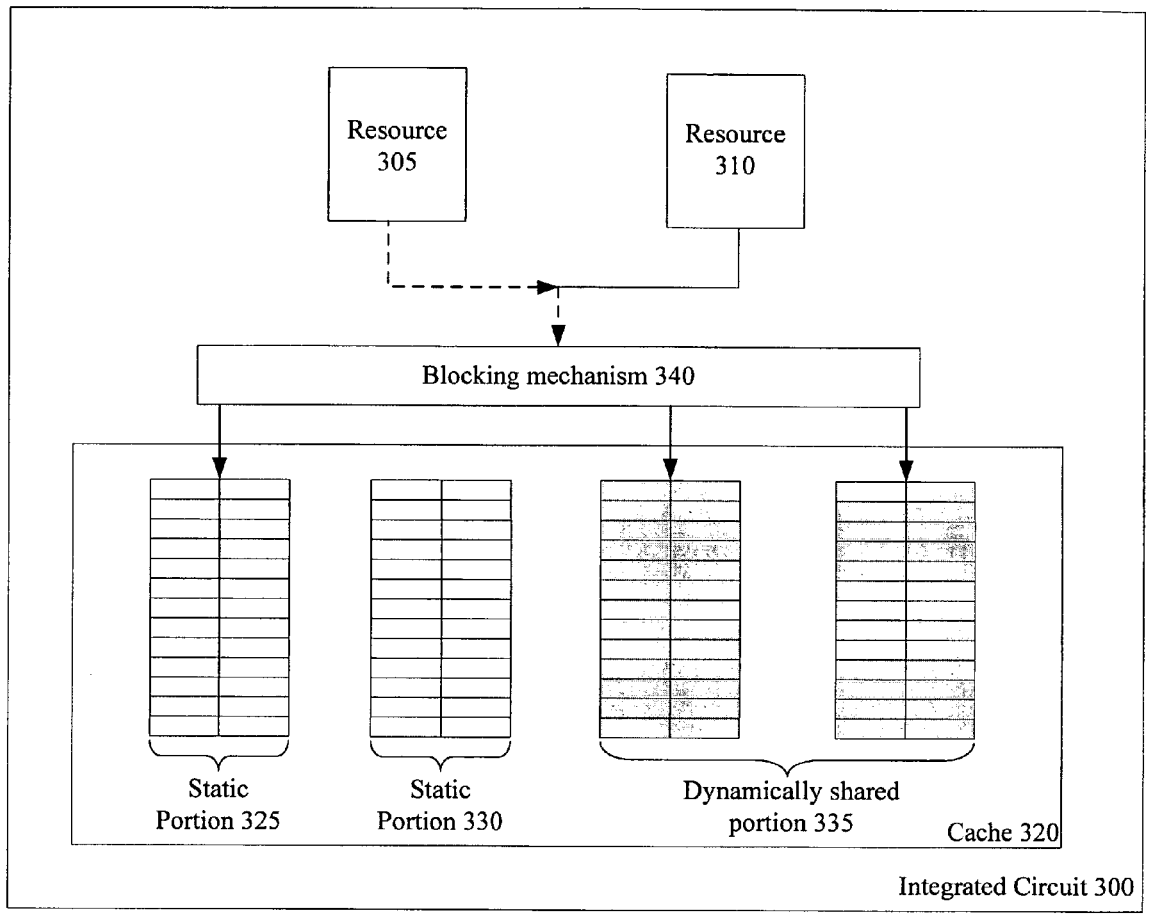
FIG. 3a illustrates an embodiment of an integrated circuit comprising two resources, the two resources sharing accesses to a cache using a blocking mechanism.

Referring next to FIG. 3a, an embodiment of an integrated circuit 300 having two resources, resource 305 and resource 310, sharing access to cache 320 utilizing blocking mechanism 340 is illustrated. Blocking mechanism 340 is used to block resources from victimizing static portions, not assigned to the resource initiating the cache lookup. Blocking mechanism 340 is shown as present outside cache 320. However, blocking mechanism may be present in cache 320 or cache control logic, which is not depicted.

Furthermore, blocking mechanism 340 is illustrated as disposed between the resources of integrated circuit 300 and the ways of cache 320. Yet, in one embodiment, blocking mechanism 340 is part of the cache lookup and allocation process, where blocking mechanism 340 does not physically block the resources from accessing cache 320, but rather merely allows a cache replacement algorithm to choose a victim way from a static portion and a dynamic portion assigned to the resource requesting the cache lookup. Consequently blocking mechanism 340 may be implemented in a logic circuit, software, or firmware.

As an example, a request from resource 305 is allowed to lookup all the ways of cache 320. Therefore, if a cache hit occurs, even in static portion 330 assigned to resource 310, then the cache line holding the data is returned to resource 305 for manipulation. In the alternative to a hit, a miss results if the requested element is not present in the cache or the cache line containing the element is in a cache state that requires an update to the cache line, such as an invalid or modified cache state. In the case of a miss, blocking mechanism 340 blocks resource 305 from victimizing static portion 330, which is assigned to resource 310. Complementary to the blocking, blocking mechanism allows resource 350 to victimize or allocate the miss to static portion 325 and dynamically shared portion 335. Inversely, if resource 310 were to make a request to cache 320 that results in a miss, blocking mechanism would block resource 310 form victimizing static portion 325 assigned to resource 305.

Figure 3B:
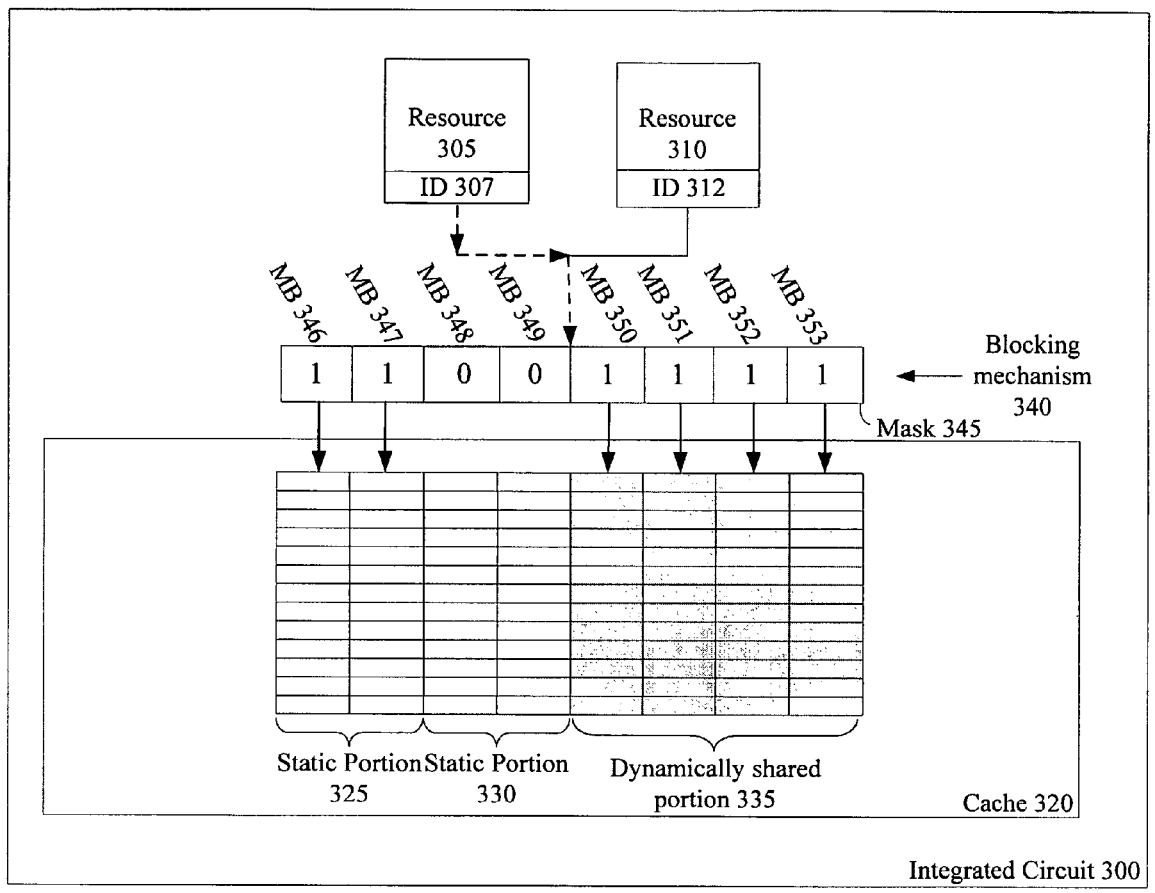
FIG. 3b illustrates an embodiment of an integrated circuit comprising two resources, the two resources sharing accesses to a cache using a mask as a blocking mechanism.

Turning to FIG. 3b, an embodiment of blocking mechanism 340 is shown. In this embodiment, mask 345 is used as blocking mechanism 340. Mask 345 comprises a plurality of mask bits, such as mask bits (MBs) 346-353. As shown in FIG. 3b, each mask bit corresponds to a way in cache 320. However, mask 345 is not so limited.

As an example, mask 345 comprises 3 bits, 1 bit for each portion illustrated. Therefore, if resource 305 is requesting an element from cache 320, a first of the three bits corresponding to static portion 325 and a second of three bits corresponding to dynamically shared portion 335 allows resource 305 to victimize static portion 325 and dynamically shared portion 335. The third of the three bits corresponding to static portion 330 blocks resource 305 from victimizing static portion 330.

Mask 345 blocks resource 305 from victimizing two ways of cache 320, which is static portion 330, based at least in part on resource identifier (ID)) 307. In one embodiment, when resource 305 requests an element from cache, mask 345 is generated based at least in part on resource ID 307. From resource ID 307 of a request, mask 345 is generated to block resource 305 from victimizing static portion 330. In an alternate embodiment, mask 345 is a static mask that is not generated on lookup. Upon determining that resource 305 initiated a cache lookup, based at least in part on ID 307, a static mask corresponding to resource 305, stored in a register or other storage device, is used in the replacement algorithm to block resource 305 from victimizing static portion 330.

In the example shown in FIG. 3b, a request is made by resource 305 to cache 320. Based at least in part on ID 307, mask 345 is generated or loaded to block resource 305 from victimizing static portion 330 and to allow resource 305 to potentially victimize static portion 325 and dynamically shared portion 335. Furthermore, mask 345 comprises eight mask bits corresponding to the eight ways of cache 320. Mask bits 348 and 349 having a first value to block resource 305 from victimizing static potion 330. Mask bits 346 and 347 corresponding to the two ways in static portion 325 and mask bits 350-353 corresponding to the four ways in dynamically shared portion 335 having a second value to allow resource 305 to potentially victimize the ways in static portion 325 and dynamically shared portion 335. In FIG. 3b, a mask bit having a logical 0 blocks a corresponding way from being allocated a cache miss, while a logical 1 allows a corresponding way to be victimized. However, it is apparent that a logical 1 or other value may block access, while a logical 0 or other value may allow access.

Mask 345 also blocks resource 310 from victimizing static portion 325, based at least in part on D 312, and allows resource 310 to potentially victimize static portion 330 and dynamically shared portion 335. As illustrated mask 345 is shown coupled between cache 320 and the resources of integrated circuit 300. Nevertheless, mask 345 may be coupled to cache 320, present in cache 320, as well as present in control logic associated with cache 320. As stated above, resource 305 and 315 may be cores, hardware threads, software threads, etc. Therefore, IDs 307 and 312 are either corresponding core IDs, physical thread IDs, virtual thread IDs, hardware thread IDs, software thread IDs, etc.

Figure 4:
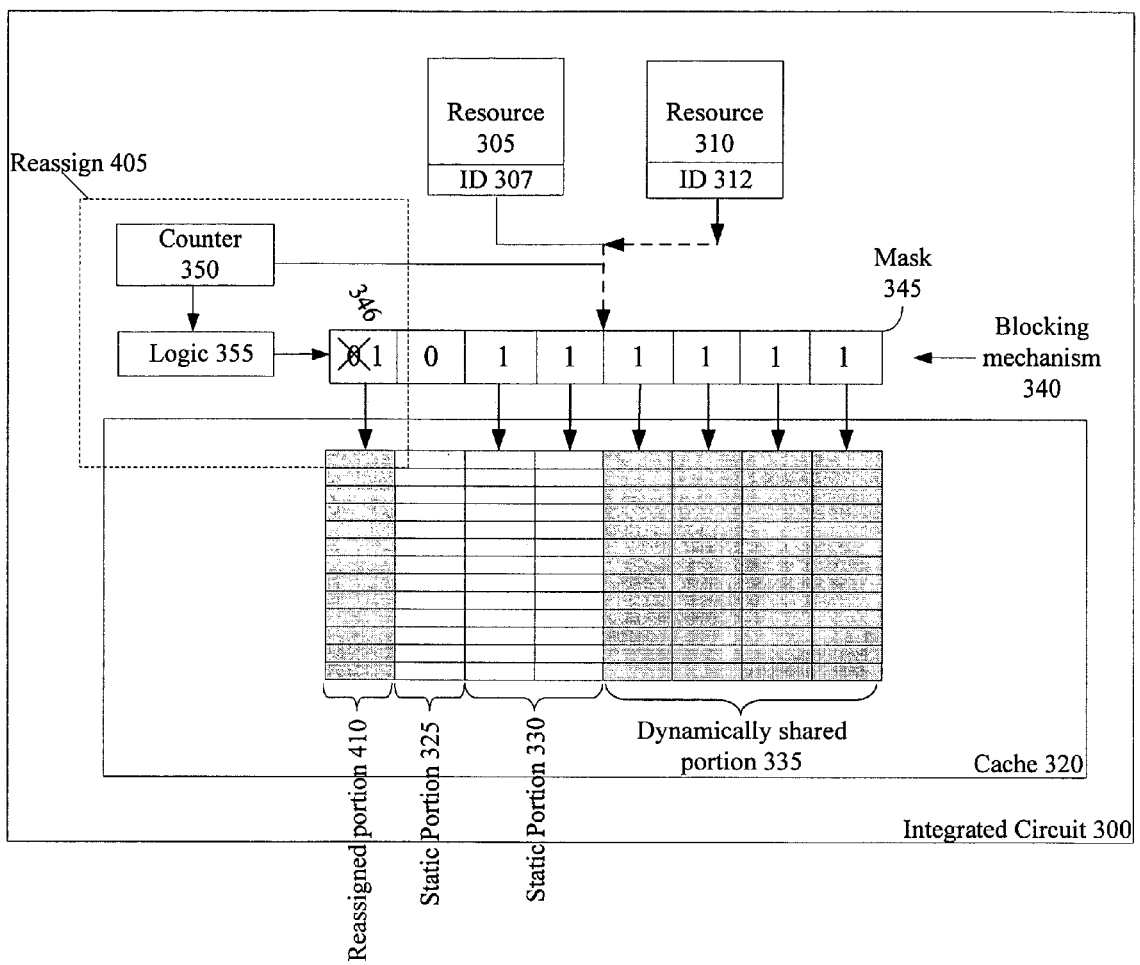
FIG. 4 illustrates an embodiment of an integrated circuit comprising two resources, the two resources sharing accesses to a cache using a mask as a blocking mechanism, wherein a counter and logic are used to reassign portions of the cache.

In FIG. 4, an embodiment of integrated circuit 300, shown in FIGS. 3a and 3b, is illustrated further comprising reassign logic 405. In furthering the fair sharing of a cache amongst resources, an idle portion of a cache not being accessed, yet, being blocked from other resources may be reassigned to the dynamic portion of the cache to be utilized by other resources. A resource, such as resource 305 or resource 310, is usually able to independently enter low power states, sleep states, or able to hit a lower-level cache consistently enough that a static portion assigned to them may be reduced or completely reassigned to a dynamic portion.

Counter 350 counts the number of accesses to the cache made by resources 305 and 310. In an alternate implementation, counter 350 only tracks accesses made by resource 305 and another counter, not shown, tracks the access made by resource 310. A cache access may be a cache lookup, a hit to the cache, a miss to the cache, or an actual allocation of a miss to a way in a cache. Logic 355 is coupled to counter 350 to reassign portion 410 from static portion 325 to dynamically shared portion 335, if resource 305 does not access cache 320 enough times over a period of time.

In a specific example, counter 350 counts the accesses made by resource 305 and the accesses made by resource 310 over a period of time. The period of time may be a predetermined period of time, as well as a programmable period of time. If, at the end of the period of time, the number of accesses made by resource 310 is less than a predetermined number, then static portion 325 is reduced by a size and dynamic portion 335 is increased by that size.

In FIG. 4, reassigned portion 410 is reassigned from static portion 325 to dynamically shared portion 335, decreasing static portion 325 by a size of 1 way and increasing the size of dynamic portion 335 by 1 way. As further illustrated, reassigned portion 410 is reassigned to dynamic portion 335, when logic 355 flips mask bit 346 in mask 345 from 0 to 1. Therefore, after reassignment, when resource 310 initiates a cache lookup, mask 345 is generated with mask bit 346 equal to 1. This allows resource 310 to victimize reassigned portion 410 as effectively part of dynamically shared portion 335.

In the example above, only a single way of static portion 325 was reassigned. However, in another implementation all of static portion 325 or any lesser part of static portion 325 is reassigned. In fact, if static portion 325 consisted of only one way, then reassigning the one way to dynamically shared portion 335 would leave no static portion assigned to resource 305.

Counter 350 and logic 355 is also operable to track accesses by resource 310 and reassigns parts of static portion 330 to dynamically shared portion 335. Furthermore, after portion 410 has been reassigned, counter 350 and logic 355 are operable to assign portion 410 back to static portion 325. As part of tracking accesses, counter 350 is operable to track misses to cache. Consequently, if counter 350 tracks resource 305 missing cache 320 enough times over a period of time, then logic 355 assigns portion 410 back to static portion 325. As an example, if portion 410 had been reassigned to dynamically shared portion 335, after resource 305 entered a sleep state, upon waking up resource 305 may begin to access or miss cache 320. If counter 350 counts enough accesses or misses, then portion 410 is assigned back to resource 305.

Essentially, if resource 305, for whatever reason, is not accessing cache 320 a predetermined number of times over a period of time, then static portion 325 is decreased in size by reassigning parts or all of static portion 325 to dynamically shared portion 335. Then, if resource 305 wakes up or for some reason begins accessing cache 320 again, then static portion 325 is increased in size by assigning back parts or all of static portion 325 that had been reassigned to dynamically shared portion 335.

Figure 5:
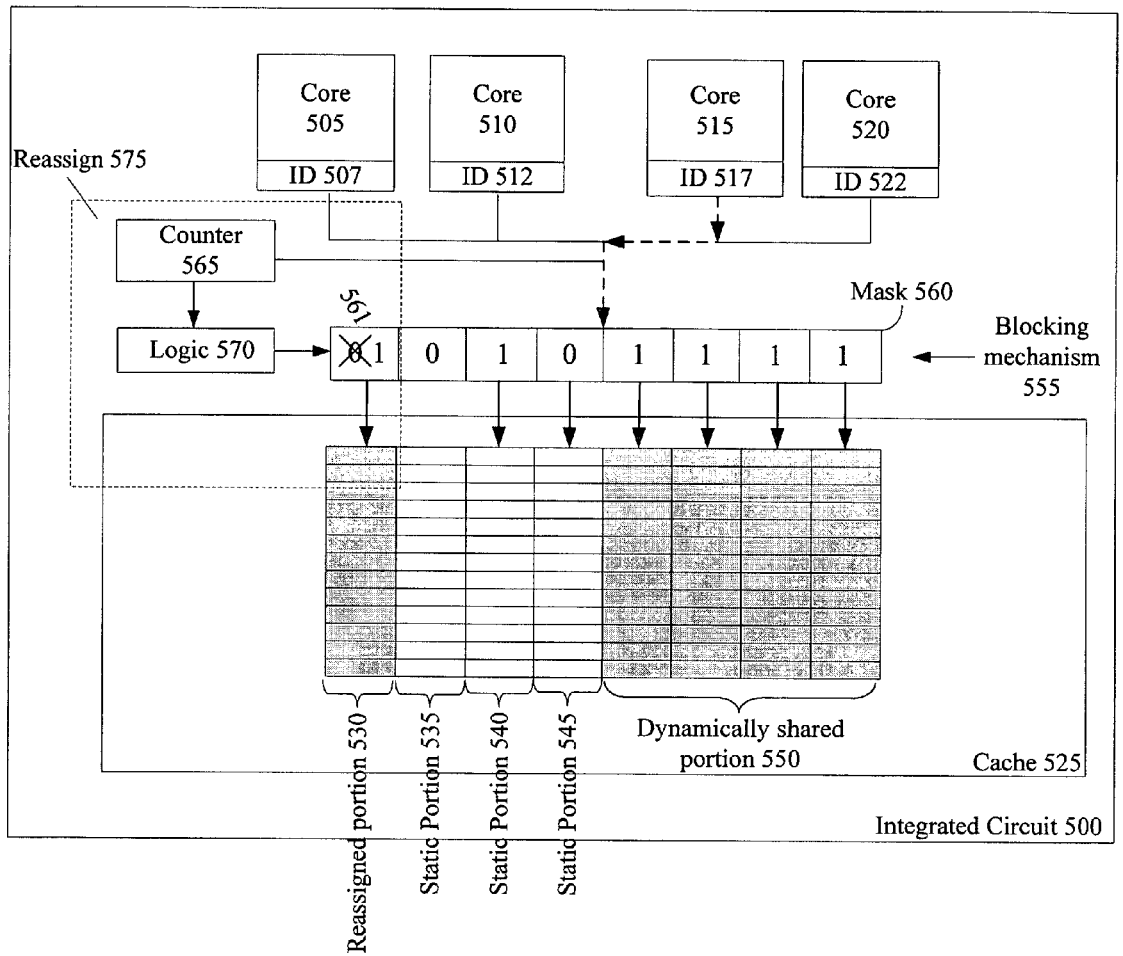
FIG. 5 illustrates an embodiment of an integrated circuit comprising four cores, the four cores sharing accesses to a cache using a mask.

In reference to FIG. 5, an embodiment of integrated circuit 500 having at least four cores that sharing access to cache 525 is illustrated. Core 505, 510, 515, and 520, have associated core IDs 507, 512, 517, and 522, respectively. As an example, when core 515 requests a lookup in cache 525, mask 560 is generated to block core 515 from victimizing portion 530 assigned to core 505, static portion 535 assigned to core 510, and static portion 545 assigned to core 520, based at least in part on core ID 517. Yet, all the ways in cache 525 are checked to see if the requested element is present. If a miss occurs, mask 560 allows core 515 to victimize static portion 540 assigned to core 515 and dynamically shared portion 550.

Furthermore, counter 565 counts at least core 505's accesses to cache 525 over a period of time. If counter 565 counts a number of access by core 505, which is less than a predetermined number, then logic 570 reassigns portion 530 to dynamically shared portion 550. Therefore, in the example above, when core 515 makes another request, or core 510, 515, or 520 make a request, to cache 525, mask 560 is generated with mask bit 561 corresponding to portion 530 as a 1. This allows core 510, 515, or 520 to allocate a miss to reassigned portion 530 as part of dynamically shared portion 550. Yet, if counter 565 counts a number of accesses or misses by core 505 to cache 525 over another period of time, then logic 570 flips mask bit 561 back and portion 530 is assigned back to core 505.

Figure 6:
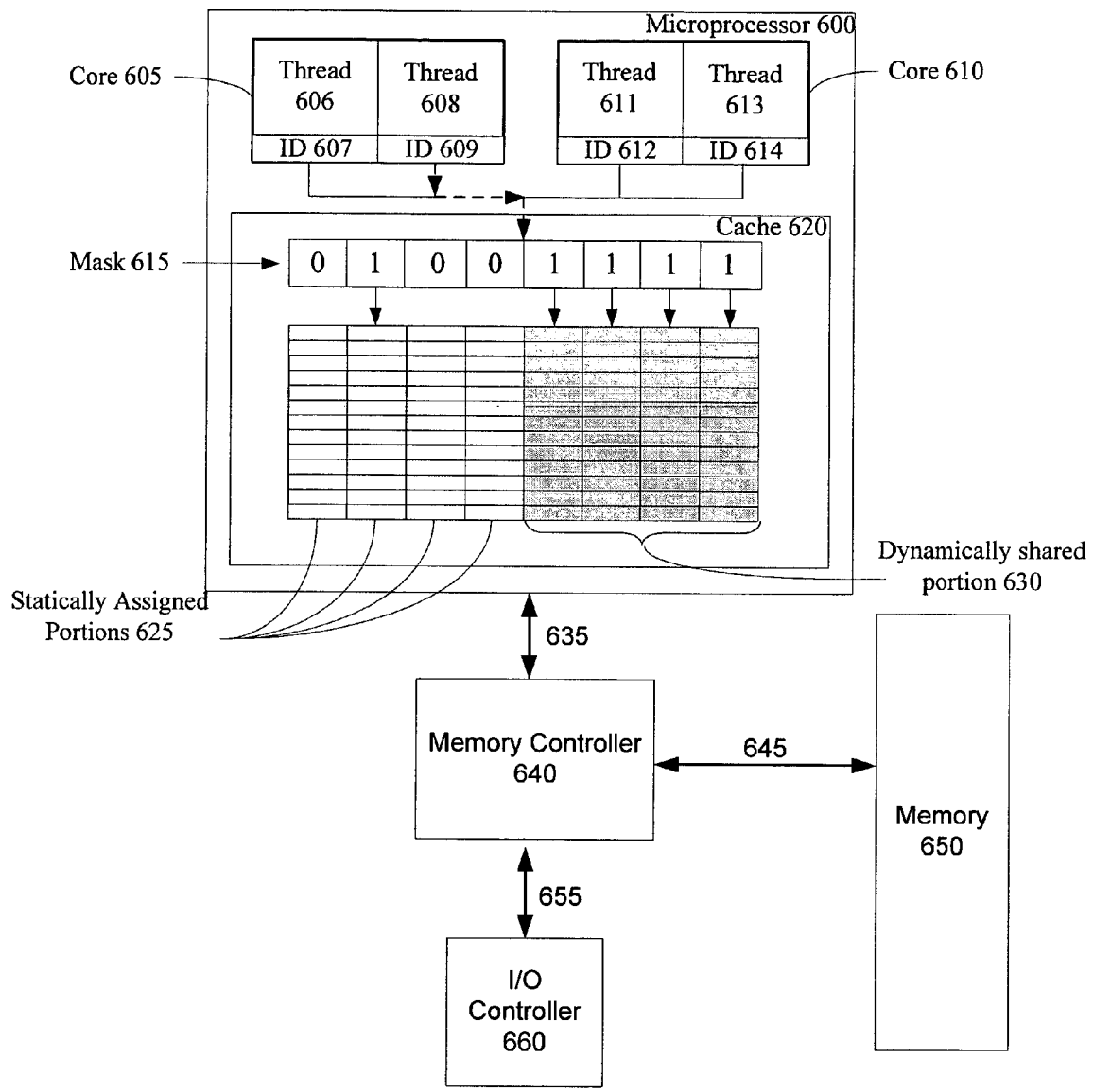
FIG. 6 illustrates one embodiment of a system having a microprocessor with two cores coupled to a memory controller and a system memory, each of the two cores having two threads, wherein the four threads share access to a cache using a mask.

Next, FIG. 6 illustrates an embodiment of a system having microprocessor 600 with two multi-threaded cores sharing access to cache 620. Microprocessor 600 is shown coupled to memory 650 through memory controller 640. Memory controller 640 is coupled to I/O controller 660 though interconnect 655. Often, memory controller 640 and 660, although on different integrated circuits, are commonly referred to as a chipset. Memory 650 is any random access memory (RAM) or dynamic RAM (DRAM). As a specific example memory 650 is a double-data rate RAM (DDR RAM). Microprocessor 600 may be capable of out-of-order speculative and non-speculative execution or capable of only in-order execution. Only a small portion of microprocessor 600 is illustrated.

In fact, microprocessor 600 may include, but is not required to include any one, any plurality, or any combination of the following: a bus interface unit to communicate and interface with external devices, an input/output ring to perform I/O operations, a virtual memory address translation unit/buffer to translate virtual memory addresses to physical memory addresses, an interrupt controller to handle interrupts, a branch prediction unit to predict branches and instructions to be speculatively executed, a pre-fetch unit to aide in fetching predicted instructions and/or operands, a fetch unit to fetch operands and instructions, a decode unit to decode fetched instructions, an instruction re-order unit to reorder instructions and micro-operations to be executed, a register file to store operands and results, an arithmetic logic unit (ALU) to perform integer operations in serial or parallel, a floating-point unit (FPU) to perform floating point operations in serial or parallel, operand registers to store single or multiple integer and/or floating-point operands, and other logic commonly associated with a microprocessor.

In one embodiment, not depicted, thread 606 and thread 608 implement fair sharing of a first low level cache dedicated to core 605, while thread 611 and 613 implement fair sharing of a second low level cache dedicated to core 610. In this embodiment, core 605 and 610 share access to higher level cache 620. Yet, in FIG. 6, cache 620 is shared among core 605, core 610, and threads 606, 608, 611, and 613 executing on core 605 and 610.

Typically, an address generation unit is used to generate a linear address, while a virtual memory address to physical address translator, i.e. a translation look-aside buffer (TLB) translates the virtual memory/linear address to a physical address in memory. Separate threads and cores may have different control registers to store different base values for translation; therefore, the same linear address generated from thread 606 and thread 611 may actually reference different physical addresses. One solution of using a context identifier to distinguish between cache hits and misses from different threads is discussed in co-pending application with Ser. No. 10/104,815 entitled Use of a Context Identifier in Cache Memory.

As an example of fair sharing of cache 620, thread 608 on core 605 generates a linear address that references an element in memory 650. A cache lookup is done in cache 620 by comparing a portion of the linear address, referred to as a tag, to tags stored in cache 620. Specifically, if an offset of the linear address is "associated" to a set within cache 620, then all of the cache lines in the set are checked to see if the element is present. If the element is present in cache 620 and the cache line containing the element is in an operable cache state, such as an exclusive cache state, a cache hit occurs. The element is then placed in an operand register indicated by thread 608 or otherwise returned for manipulation by thread 608.

However, if the element is not present within cache 620 or the cache line containing the element is in an inoperable state, such as an invalid state, then a way within cache 620 is chosen to allocate the miss to. Mask 615, upon lookup and based at least in part on thread ID 609, is generated. Only one way is assigned to thread 608, as indicated by the logical 1 value corresponding to the way within statically assigned portions 625. Consequently, a common cache replacement algorithm can choose between the single assigned way and the four ways within dynamically shared portion 630 to victimize. The element is then fetched from memory 650 and the corresponding cache line within the way chosen to be victimized is updated.

Figure 7:
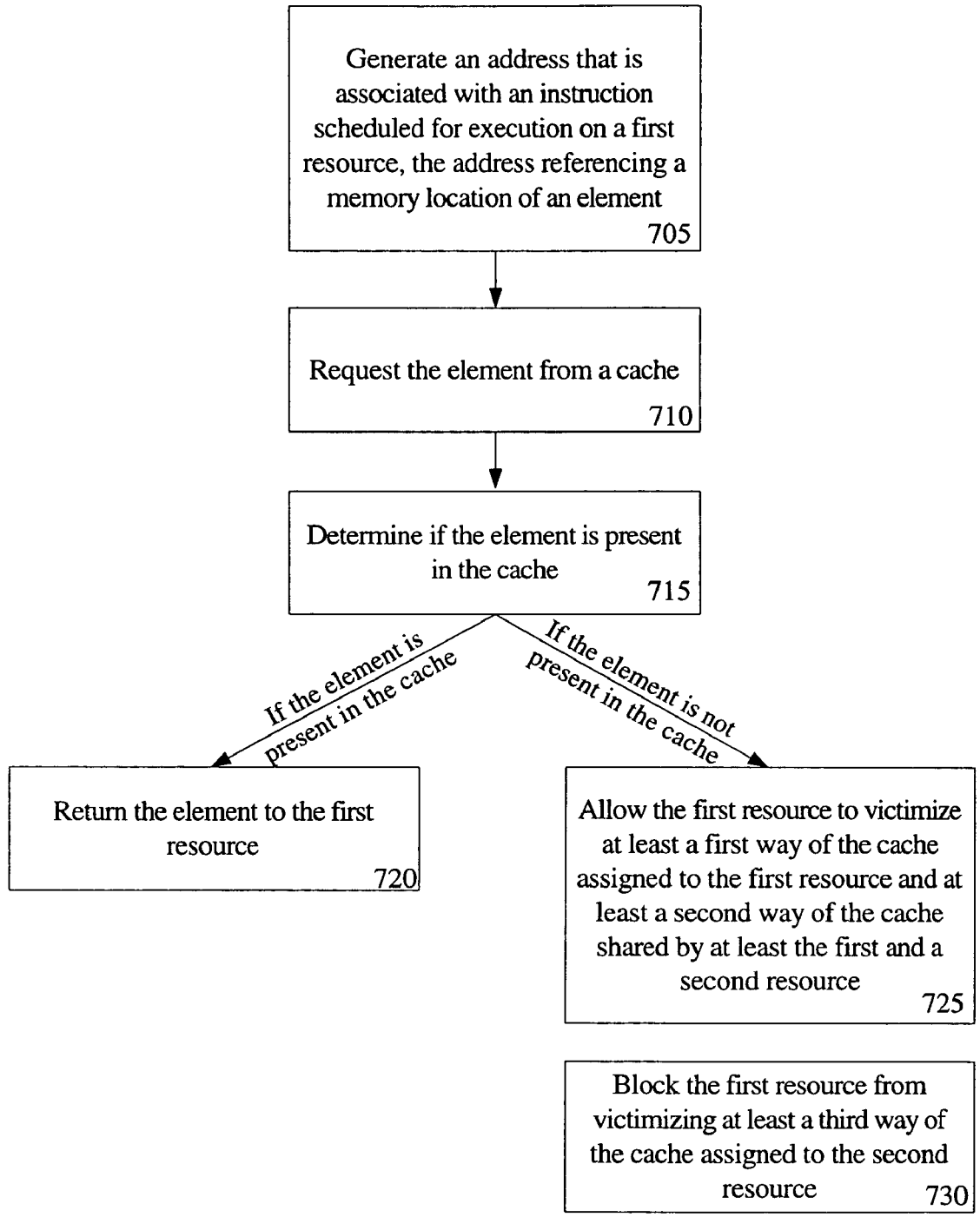
FIG. 7 illustrates an embodiment of a flow diagram for a method of sharing access to a cache.

Turning to FIG. 7, an embodiment of a block diagram for a method of sharing access to a cache is illustrated. In block 705, an address is generated that is associated with an instruction scheduled for execution on a first resource, the address referencing a memory location of an element. As an example, the address is a linear address that references the memory location by offsets from a value stored in a register associated with the first resource. An element is usually an instruction, operand, or anything else commonly stored in memory. Next, in block 710, the element is requested from a cache. Requesting an element from cache can be any action initiating a lookup in the cache.

In block 715, it is determined if the element is present in the cache. If a linear address is generated, then determining if the element is present in cache comprises comparing a portion of the linear address to tag values stored in the cache. In some implementations, it is also required that the linear address be fully decoded and check against a cache line to determine whether the element is present in the cache. As an example, all the ways of a cache are checked to determine if the element is present in the cache.

If the element is not present in the cache, i.e. a cache miss, then in block 725, the first resource is allowed to victimize at least a first way of the cache assigned to the first resource and at least a second way of the cache shared by at least the first and a second resource. Furthermore, in block 730, the first resource is blocked from victimizing at least a third way of the cache assigned to the second resource. In one embodiment, allowing the first resource to victimize at least the first and second way and blocking the first resource from victimizing at least the third way is based at least in part on the first resource ID. From the resource ID of the request, a mask or other blocking mechanism allows or blocks access based on the requesting resource's ID. Consequently, upon choosing a way to allocate the miss, using a common cache replacement algorithm, a selection is made between at least a first way and at least a second way of the cache, blocking the third way assigned to the second resource from the selection.

Figure 8:
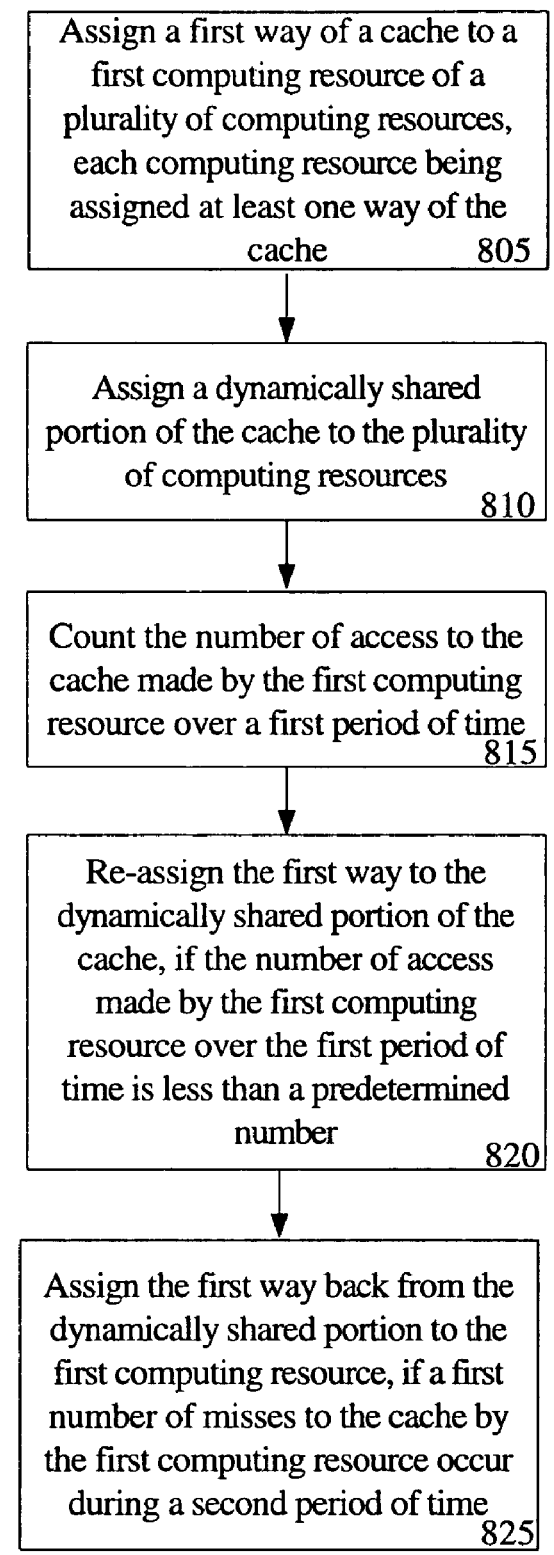
FIG. 8 illustrates an embodiment of a flow diagram for a method of sharing access to a cache.

Another embodiment of a block diagram for a method of sharing access to a cache is illustrated in FIG. 8. In block 805, a first way of a cache is assigned to a first computing resource of a plurality of computing resources, each computing resource being assigned at least one way of the cache. In block 810, a dynamically shared portion of the cache is assigned to the plurality of computing resources. As one example, a way is assigned to a resource through a blocking mechanism. Whether the blocking mechanism is statically stored or generated upon a cache lookup, the blocking mechanism "assigns" or associates each computing resource with a static portion, as well as assigning the dynamic portion to the plurality of computing resources.

In block 815, the number of access to the cache made by the first computing resource is counted over a period of time. In one embodiment, an access is merely a lookup in the cache. As another example, an access is a lookup in the cache, which results in a cache miss. The period of time is a predetermined period of time. Next, in block 820, the first way is reassigned to the dynamically shared portion of the cache, if the number of access made by the first computing resource over the first period of time is less than a predetermined number. If at the end of the period of time, the counter has not counted the predetermined number of accesses by the first computing resource, then the counter trips, which may include sending a signal or providing a logical value that indicates the first computing resource has not accessed the cache at least the predetermined number of times. Based on the trip signal or logical value, the first way is reassigned. In one embodiment, reassigning the first way comprises changing a mask bit in a mask that allows all of the plurality of resources to victimize the first way as part of the dynamically shared portion.

Additionally, if a first number of misses to the cache by the first computing resource occur during a second period of time, then in block 825, the first way is assigned back from the dynamically shared portion to the first computing resource. Similar to the operation of reassigning, if the first computing resource accesses the cache a specified number of times over the second period of time, then, in the embodiment described above, the mask bit that was flipped to reassign the first way to the dynamically shared portion is flipped back to assign the first way back to the first computing resource.

Fair sharing of caches among multiple resources as described above, allows for different independent program threads to shared data and instructions without having duplicate misses. However, by setting up a static portion of the cache for each resource and allowing access to a dynamic portion of the cache, destructive interference is avoided by ensuring at least a static portion assigned to a resource is available. Furthermore, if one of the resources enters a low power state or does not require the amount of static portion assigned to it, then using reassign logic, the static portion is reduced and the dynamic portion shared by all of the resources is increased to avoid wasted reservation of cache space. Additionally, if a computing resource, that has had its static portion reduced, requires more access to the cache, then the part of the static portion reassigned is assigned back to the static portion to reassure the fair sharing of cache.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An integrated circuit comprising:
   a cache having a plurality of static portions and a dynamically shared portion;
   a plurality of computing resources, each computing resource operable to victimize one of the plurality of static portions of the cache assigned to the computing resource and the dynamically shared portion; and re-assignment logic to reassign at least one way within a first static portion of the plurality of static portions to the dynamically shared portion, in response to tracking, over a period of time, that an access activity level of a first computing resource associated with the first static portion is below a predetermined threshold.

2. The integrated circuit of claim 1, wherein the plurality of computing resources include a first number of cores.

3. The integrated circuit of claim 1, wherein the plurality of computing resources include a first number of threads.

4. The integrated circuit of claim 1, wherein the plurality of computing resources comprise at least one core and at least one thread.

5. The integrated circuit of claim 1, wherein the re-assignment logic includes counting logic to count a number of times each computing resource accesses the cache over a period of time.

6. The integrated circuit of claim 5, wherein the re-assignment logic to reassign at least one way within a first static portion to the dynamically shared portion in response to an access activity level of a first computing resource associated with the first static portion being below a predetermined threshold comprises: the re-assignment logic to reassign at least one way within a first static portion to the dynamically shared portion in response to the number of times the first computing resource accesses the cache over the period of time is less than the predetermined threshold.

7. The integrated circuit of claim 6, wherein an access to the cache comprises requesting an element from the cache, the element having an associated address.

8. The integrated circuit of claim 6, wherein an access to the cache comprises requesting an element from an address that results in a cache miss.

9. The integrated circuit of claim 1, wherein each computing resource operable to victimize one of the static portions of the cache assigned to the computing resource and the dynamically shared portion comprises:
each computing resource being operable to replace a line of the cache, upon a miss, only in the one static portion of the cache assigned to the computing resource and the dynamically shared portion, and not operable to replace a line of the cache, upon a miss, in one of the static portions assigned to another computing resource.

10. The integrated circuit of claim 9, wherein each computing resource is also operable to hit a line of cache present in the one static portion of the cache assigned to the computing resource, one of the static portions assigned to another computing resource, and the dynamically shared portion.

11. The integrated circuit of claim 1, wherein the plurality of static portions are equal in number to a number of the plurality of computing resources, and wherein the dynamically shared portion of the cache has a size in ways equal to the number of the plurality of computing resources.

12. The integrated circuit of claim 11, wherein the cache has a size of 16 ways, the number of the plurality of computing resources is equal to 8, the dynamically shared portion has a size equal to 8 ways of the cache, and wherein there are 8 total static portions, each static portion having a size equal to 1 way of the cache.

13. A microprocessor comprising:
a first core having an associated first core identifier (ID);
a second core having an associated second core ID;
a cache logically organized into a plurality of ways; and
a blocking mechanism to:
block the second core from victimizing a first number of ways, of the plurality of ways, based at least in part on the second core ID,
block the first core from victimizing a second number of ways, of the plurality of ways, based at least in part on the first core ID, and
allow the first and second cores to victimize a third number of ways, of the plurality of ways; and
a dynamic assignment mechanism to:
assign at least a first way of the first number of ways to the third number of ways in response to tracking a low activity level associated with the first core over a period of time, and
assign at least a second way of the second number of ways to the third number of ways in response to tracking a low activity level associated with the second core over a period of time.

14. The microprocessor of claim 13, wherein the blocking mechanism comprises a mask generated upon a cache lookup based at least in part on:
the first core ID, if the first core initiates the cache lookup; and
the second core ID, if the second core initiates the cache lookup.

15. The microprocessor of claim 14, wherein the mask comprises a plurality of mask bits, each mask bit corresponding to one of the plurality of ways.

16. The microprocessor of claim 15, wherein each of the plurality of mask bits corresponding to the first number of ways, of the plurality of ways, have a first value to block the second core from victimizing the first number of ways based at least in part on the second core ID, if the second core initiated the cache lookup.

17. The microprocessor of claim 16, wherein each of the plurality of mask bits corresponding to the second and third number of ways have a second value to allow the second core to victimize the second and third number of ways based at least in part on the second core ID, if the second core initiated the cache lookup.

18. The microprocessor of claim 13, wherein the dynamic assignment mechanism includes:
a first counter to count a first number of access to the cache associated with the first core over a period of time;
a second counter to count a second number of accesses to the cache associated with the second core over the period of time, and
comparison logic to determine the first core is associated with a low activity level in response to the first number of accesses being less than a predetermined number of accesses, and to determine the second core is associated with a low activity level in response to the second number of access being less than the predetermined number of accesses.

19. An apparatus comprising:
a cache;
a first computing resource to victimize a first statically assigned portion of the cache and a dynamic portion of the cache;
a second computing resource to victimize a second statically assigned portion of the cache and the dynamic portion of the cache;
a counter to count a first number of accesses to the cache by the first computing resource over a period of time and a second number of accesses to the cache by the second computing resource over the period of time; and
logic operable to
decrease the first statically assigned portion of the cache by a size and increase the dynamic portion of the cache by the size, if at the end of the period of time, the first number of accesses is less than a predetermined number, and decrease the second statically assigned portion of cache by the size and increase the dynamic portion of the cache by the size, if at the end of the period of time, the second number of accesses is less than the predetermined number.

20. The apparatus of claim 19, wherein the first and second computing resources are selected from a group consisting of a core, a hardware thread, and a software thread.

21. The apparatus of claim 19, wherein the cache is organized into a plurality of ways, and wherein the first statically assigned portion of the cache includes a first way, of the plurality of ways, and the second statically assigned portion of the cache includes a second way, of the plurality of ways.

22. The apparatus of claim 21, wherein decreasing the first statically assigned portion of the cache by a size and increasing the dynamic portion of the cache by the size comprises reassigning the first way to the dynamic portion of the cache, and wherein decreasing the second statically assigned portion of cache by the size and increasing the dynamic portion of the cache by the size comprises reassigning the second way to the dynamic portion of the cache.

23. The apparatus of claim 22, wherein the logic is also operable to assign the first way back to the first statically assigned portion of the cache, upon a predetermined number of misses to the cache by the first computing resource, and where the logic is further operable to assign the second way back to the second statically assigned portion of the cache, upon the predetermined number of misses to the cache by the second computing resource.

24. The apparatus of claim 19, wherein accessing the cache comprises generating an address of an element to be retrieved and comparing a portion of the address to a tag value in the cache.

25. The apparatus of claim 19, wherein accessing the cache comprises requesting an element from an address that results in a cache miss.

26. A system comprising:
a system memory comprising a plurality of memory locations to store elements, each memory location referenced by a physical address; and
a microprocessor coupled to the system memory comprising
an address translation unit to translate virtual memory addresses to physical addresses, the physical addresses referencing the plurality of memory locations,
a cache logically organized into a plurality of ways to store recently fetched elements from the plurality of memory locations,
a plurality of resources assigned a dynamically shared first number of ways, of the plurality of ways, wherein each resource is also assigned a static second number of ways, of the plurality of ways, and
logic to reassign at least one of the static second number of ways assigned to a first resource, of the plurality of resources, to the dynamically shared first number of ways, if the first resource does not access the cache a predetermined number of times over a period of time.

27. The system of claim 26, wherein the system memory is a random access memory chip.

28. The system of claim 26, wherein the elements are selected from a group consisting of instructions, operands, and data operands.

29. The system of claim 26, wherein the address translation unit comprises a translation look-aside buffer (TLB).

30. The system of claim 26, wherein the cache is logically organized as a set associative cache.

31. The system of claim 26, wherein the plurality of resources are a plurality of multi-threaded cores.

32. The system of claim 31, wherein there are four multi-threaded cores and the cache has 8 ways.

33. The system of claim 32, wherein the dynamically shared first number of ways is equal to 4 and wherein the static second number of ways assigned to each of the four multi-threaded cores is equal to 1.

34. A method comprising:
associating a dynamically shared number of ways of a cache with a plurality of computing resources;
associating a static way of the cache, which is not part of the dynamically shared number of ways, only with a first computing resource of the plurality of computing resources;
counting a number of access to the cache made by the first computing resource over a first period of time;
re-assigning the static way to the dynamically shared number of ways in response to the number of accesses being less than a predetermined number.

35. The method of claim 34, further comprising after reassigning the first way to the dynamically shared number of ways, assigning the first way back from the dynamically shared number of ways to the first computing resource, if a first number of misses to the cache by the first computing resource occur during a second period of time.

36. The method of claim 35, wherein the first number of misses is one.

37. The method of claim 34, wherein the plurality of computing resources are selected from a group consisting of single threaded cores, multi-threaded cores, and threads.

38. The method of claim 34, wherein an access to the cache comprises requesting an element from the cache.

39. The method of claim 34, wherein an access to the cache comprises a miss to the cache by the first computing resource.

* * * * *